United States Patent
Fujii et al.

(10) Patent No.: US 7,194,751 B2
(45) Date of Patent: Mar. 20, 2007

(54) OPTICAL INFORMATION MEDIUM

(75) Inventors: Toru Fujii, Tokyo (JP); Yuji Tomizawa, Tokyo (JP); Emiko Hamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 710 days.

(21) Appl. No.: 10/198,374

(22) Filed: Jul. 18, 2002

(65) Prior Publication Data

US 2003/0039201 A1  Feb. 27, 2003

Related U.S. Application Data

(63) Continuation of application No. 08/965,875, filed on Nov. 7, 1997, now Pat. No. 6,445,676.

(30) Foreign Application Priority Data

Nov. 20, 1996 (JP) .................................. 8-323296

(51) Int. Cl.
*G11B 3/70* (2006.01)
*G11B 5/84* (2006.01)
(52) U.S. Cl. ...................................... 720/718; 369/281
(58) Field of Classification Search ................ 720/718; 369/281, 282
See application file for complete search history.

(56) References Cited

U.S. PATENT DOCUMENTS

| 4,634,617 | A | * | 1/1987 | Ohta et al. .................. 428/65.2 |
| 4,969,143 | A | * | 11/1990 | Ogino ...................... 369/275.5 |
| 5,080,946 | A | * | 1/1992 | Takagisi et al. ............ 428/64.9 |
| 5,313,452 | A | * | 5/1994 | Usami et al. ............. 369/275.1 |
| 5,406,544 | A | * | 4/1995 | Clark et al. .............. 369/275.3 |
| 5,459,712 | A | * | 10/1995 | Sugaya et al. ........... 369/275.4 |
| 5,554,451 | A | * | 9/1996 | Taki et al. ................ 428/823.1 |
| 5,618,638 | A | * | 4/1997 | Taki ......................... 428/820.1 |
| 5,673,251 | A | * | 9/1997 | Suzuki et al. ............ 369/275.4 |
| 5,696,754 | A | * | 12/1997 | Nishizawa ............... 369/275.1 |
| 6,445,676 | B1 | * | 9/2002 | Fujii et al. .................. 369/281 |

* cited by examiner

*Primary Examiner*—Brian E. Miller
(74) *Attorney, Agent, or Firm*—Flynn, Thiel, Boutell & Tanis, P.C.

(57) ABSTRACT

An optical information medium comprises a pair of discs which are bonded to each other, an optical recording layer provided on at least one of the discs, and a reflecting layer formed on an upper side of the optical recording layer. The optical information medium further includes an adhesive for bonding the pair of discs provided on the reflecting layer, wherein the adhesive has a thickness ranging from 10 to 80 μm. A protecting layer is provided on the upper side of the reflecting layer wherein the pair of discs may be bonded by the protecting layer. The optical recording layer, reflecting layer and protecting layer may be directly sequentially provided on the disc but another substrate layer may be inserted between these layers. There is employed, as the adhesive, those including a reactive curing resin or a hot melt material, and it is preferable that the shrinkage rate of the adhesive be less than 15%.

1 Claim, 9 Drawing Sheets

(a)

(b)

(c)

(d)

(e)

(a)

(b)

OPTICAL INFORMATION MEDIUM

This is a continuation of Ser. No. 08/965,875, filed Nov. 7, 1997, now U.S. Pat. No. 6,445,676.

BACKGROUND OF THE INVENTION

1. Field of the Invention

The present invention relates to an optical information medium comprising one disc formed of a transparent substrate and having an optical recording layer and a reflecting layer at least on one surface thereof and another disc which is bonded to one disc by an adhesive.

2. Prior Art

A digital video disc (DVD) capable of recording and reproducing information with high-density has been now put into practical use associated with the recent development and practical utilization of laser light having a short wavelength. The optical information medium of this type can adopt a structure for bonding two pieces of discs.

A read-only optical information medium having such a structure for bonding two surfaces of discs has a center hole at the center thereof and a clamping area at the outside thereof. A pair of discs which are bonded to each other include at least one transparent substrate comprising at one surface thereof, an information recording area formed outside the clamping area, pits serving as an information recording means formed on the information recording area, and a reflecting layer formed of a metal film and provided on the pit.

Further, as an optical information medium capable of recording information, a tracking guide is formed on the information recording area of at least one substrate, and the substrate is coated with organic dye, etc. by means of a spin-coating process, to form an optical recording layer, and a reflecting layer formed of a metal film is formed on the optical recording layer. Still further, the entire surfaces of a pair of discs are coated with a reactive curing resin as an adhesive by means of a spin-coating process or a screen printing, and the coated surfaces are laid on top of the other to oppose each other, and two discs are bonded to each other by the adhesive set forth above.

In a WORM (write once, read many times) optical information medium, there is employed a system for coating the transparent substrate with a dye material such as an organic dye with a given thickness to form an optical recording layer, and forming a reflecting film such as a metal film on the optical recording layer.

In such a WORM optical information medium, if the optical recording layer of the disc is coated with an adhesive such as a reactive curing resin by a spin coating process or screen printing, etc., and two discs are bonded to each other by this adhesive, residual stress is generated in the joining boundary between the different materials, whereby the discs are liable to warp and the adhesive surface is liable to flake due to the warpage of the discs. Further, there occurs a problem that when a shock is applied to the discs, the discs are liable to flake, thereby deteriorating the shock resistance. Particularly, the flaking is liable to occur at the edges of the two discs, which causes a problem of brittleness against the shock on the edges. Still further, since the adhesion between the two discs deteriorate, the moisture in the air is liable to enter the discs, which causes a problem of deterioration of the layer with moisture.

If a reaction-sensitive resin is employed as an adhesive layer, the shrinkage involved in the curing occurs, and the stress generated thereby influences the recording layer, thereby distorting the recording layer. As a result, a variation of tracking signal and/or reflectance occurs when the discs are reproduced with a laser beam. The variation rate exceeds 30%, thereby obstructing the record and reproduction of the information.

When the discs are bonded by the adhesive, one surface of one disc is coated with an adhesive, and another surface of another disc is overlaid on one disc, thereafter they are irradiated with light so as to cure the adhesive. When one disc is laid on top of the other, bubbles are liable to enter between the two discs, and hence the stress is liable to occur by bubbles at the time of the bonding of the discs, and the magnitude of the stress increases. Accordingly, the influence of the stress upon the recording layer also increases, and there is a possibility that the optical disc is deformed to the extent to be recognized visually. A vacuum degassing apparatus is employed to prevent bubbles from entering the adhesive layer when the discs are bonded to each other, which makes the apparatus large-scaled, and hence increases the operating process, which causes a problem of deterioration of productivity.

SUMMARY OF THE INVENTION

It is a first object of the invention to reduce a stress even if the stress occurs owing to bubbles which are produced when two discs are bonded by an adhesive. It is a second object of the invention to reduce the shrinkage of the adhesive involved in the curing of the adhesive layer. It is a third object of the invention to restrain the variation rate of reflectance and the variation of a push-pull signal which are caused when the adhesive layer is cured, thereby permitting the signal level not to reach a critical value. It is a fourth object of the invention not to deform the discs from the shrinkage involved in the curing of the adhesive layer. It is a fifth object of the invention to select a suitable material from an ordinary material for use in the adhesive layer, thereby dispensing with the use of a specially prepared material. It is a sixth object of the invention to perform a bonding operation using the adhesive in a simple manner without using a large-scale apparatus such as a degassing apparatus, thereby enhancing productivity. It is a seventh object of the invention to increase the resistivity of friction of the adhesive for bonding the discs.

The optical information medium comprises a pair of discs 1 and 5 which are to be bonded to each other, an optical recording layer 12 which is formed on at least one of the discs 1 and 5 at the surface where the discs 1 and 5 are bonded and a reflecting layer 13 formed over the optical recording layer 12. The optical information medium according to the present invention has an adhesive 11 for bonding a pair of discs 1 and 5 by way of the optical recording layer 12 and reflecting layer 13 in the aforementioned optical information medium, and the thickness of the adhesive 11 ranges from 10 to 80 μm. A protecting layer 14 may be formed over the reflecting layer 13, and the pair of discs 1 and 5 are bonded to each other by way of the protecting layer 14.

The optical recording layer 12, the reflecting layer 13 and the protecting layer 14 to be formed on the disc 1 are sequentially directly formed in this order, but another layer may be inserted between these layers. The reactive curing resin, or a hot melt material, or the like is used as the adhesive 11, particularly, it is preferable that the shrinkage rate of the adhesive 11 be less than 15% when it cured by irradiation of UV ray.

Since the thickness of the adhesive 11 ranges 10 to 80 μm, the coating layer of the UV curing resin adhesive, for instance, has a sufficient viscosity, and even if bubbles are produced when the main surface of the other disc contacts the coating layer, the viscous adhesive of the coating layer flows to fill up the bubble holes. Even if the viscous adhesive of the coating layer is cured by the irradiation of the UV rays while bubbles remain therein, the stress generated based on these bubbles can be reduced by the deformation caused by the plasticity and elasticity of the resin, thereby reducing the influence upon the recording layer. If the thickness of the adhesive 11 is less than 10 μm, the bubbles cannot be filled up by the deformation of the adhesive 11. On the other hand, if the thickness of the adhesive 11 exceeds 80 μm, the curing speed of the adhesive 11 reduces so that the adhesive 11 is liable to be non-curable.

As mentioned above, the optical information medium of the present invention can reduce the stress even if the stress is generated from the bubbles produced in the adhesive layer. Further, the shrinkage of the adhesive 11 when it cures is small, the variation rate of the reflection and the variation of push-pull signal do not reach critical levels from the shrinkage of the adhesive 11 when it cures. The deformation of the adhesive when it cures is not recognized from the external appearance, and further, the adhesive can be selected from an ordinary material without using the specially prepared material, and a large-scale degassing apparatus is not required, so that the bonding of the discs by the adhesive can be performed in the ordinary bonding manner.

Grooves 6 and 6 are defined in at least one of the discs 1 and 5 at the outer periphery of the adhesive surface thereof, and the outer peripheries of the discs 1 and 5 may be bonded to each other by the adhesive 11 filled in these grooves 6 and 6. In such an optical information medium, the adhesive 11 is filled in the grooves 6 and 6 to increase the bonding surface area by the adhesive 11 compared with a case where only the flat main surfaces of the discs 1 and 5 alone are bonded to each other by the adhesive 11, so that the resistivity of friction at the outer peripheries of the discs 1 and 5 increases by a so-called anchor effect.

The grooves 6 and 6 may be defined in the outer peripheries of the discs 1 and 5 or may be defined in the center side from the outer peripheries of the discs 1 and 5. In the latter case, since the grooves 6 and 6 do not appear on the outer peripheral surfaces of the discs 1 and 5, they present the same outer peripheral surfaces in external appearance as an optical information medium having no grooves 6 and 6.

A part 11a of the adhesive 11 bonding the discs 1 and 5 may be fixed to an outer peripheral surface of at least one of the discs 1 and 5. Even in such an optical information medium, the fixing surface area of the adhesive 11 increases because the adhesive 11 is fixed to the outer peripheral surfaces of the discs 1 and 5 compared with the case where the adhesive 11 is fixed to only the flat main surfaces of the discs 1 and 5, the resistivity of friction at the outer peripheries of the discs 1 and 5 increases by a so-called anchor effect.

In this case, inclined surfaces 15 and 15 which are obtuse or acute relative to the bonding surfaces of the discs 1 and 5 may be formed on the outer peripheral surfaces of the discs 1 and 5 to which the part 11a of the adhesive 11 is fixed. If the inclined surfaces 15 and 15 which are obtuse relative to the bonding surfaces of the discs 1 and 5 are formed, the adhesive 11 does not necessarily protrude largely from the outer peripheral edges of the discs 1 and 5 so that adhesive 11 does not largely influence the outer peripheral shape of the optical information medium. On the other hand, if the inclined surfaces 15 and 15 are acute relative to the bonding surfaces of the discs 1 and 5, the outer periphery of the adhesive 11 moves around to the back side of the bonding surfaces of the discs 1 and 5 and it is bonded to the back side, enhancing the anchor effect to obtain high resistivity of friction.

The discs 1 and 5 are bonded together by the adhesive 11 not only at an information recording area r on the bonding surfaces of the discs 1 and 5 but also at an inner information non-recording area i formed at the inner peripheries of the discs 1 and 5. That is, the entire surfaces of the discs 1 and 5 are bonded together by the adhesive 11 to extend from the center holes 4 to the outer most peripheries thereof. As a result, the entire surfaces of the two discs 1 and 5, including the information non-recording area i formed at the inner peripheries of the discs 1 and 5, are bonded to each other so that the resistivity of friction of the discs 1 and 5 increases and the adhesion between the discs 1 and 5 is enhanced. Particularly, since the adhesive 11 reaches the center holes 4 of the discs 1 and 5 and the edges of the center holes 4 of the discs 1 and 5 are bonded by the adhesive 11, the discs 1 and 5 hardly flake at the inner peripheries of the center holes 4, thereby enhancing the hermeticity between the discs 1 and 5.

A groove 7 is defined between the center holes 4 of the discs 1 and 5 and the information non-recording area i at the bonding surfaces, and the adhesive 11 is filled in the groove 7, thereby increasing the fixing surface area of the adhesive 11, and hence the resistivity of friction increases at the inner peripheries of the discs 1 and 5 by a so-called anchor effect. If a rough surface 8 is formed between the center holes 4 of at least one of the discs 1 and 5 and the information non-recording area i at the bonding surfaces thereof, the fixing surface area of the adhesive 11 increases by the rough surface 8 so that the resistivity of friction at the inner peripheries of the discs 1 and 5 increases. Such a rough surface 8 may be character information which is engraved on the surfaces of the discs 1 and 5, for example, a lot number of a product number.

The discs 1 and 5 are bonded in principal at their entire surfaces which oppose each other. In this case, it is preferable that the surface including an area having no optical recording layer 12 is bonded to another disc 5 without forming the optical recording layer 12 on at least a part of the surface except the information recording area r of the disc 1. In other words, a marginal part where no optical recording layer 12 is formed at the outer periphery and/or inner periphery of the information recording area r in which the signal of the disc 1 is recorded, and the surface including this marginal part where the optical recording layer 12 of the disc 1 is provided may be bonded to another disc 5. The width of the marginal part of the disc 1 is more than 0.1 mm. It is more preferable that the width of the marginal part exceed 1.5 mm.

In such an optical information medium, the optical recording layer 12 is not formed on the outside of the information recording area r of the disc 1, namely, on the marginal part outside the area whole information recording, and the marginal part is bonded directly by the adhesive 11 without interposing the optical recording layer 12. Accordingly, the discs 1 and 5 are bonded to each other with a high resistivity of friction at the marginal part. Since the marginal part locates outside the information recording area r, the resistivity of friction adjacent to the edges of the discs 1 and 5 is enhanced, thereby protecting the information recording area r inside the edges.

Meanwhile, it is possible to form a non-bonding area m at the peripheries of the center holes 4 of the discs 1 and 5 where the part of the adhesive 11 is not bonded without bonding the entire surfaces of the discs 1 and 5. In such an optical information medium, the non-bonding area m is formed on the peripheries of the center holes 4 and the adhesive 11 is not bonded onto the non-bonding area m so that the adhesive 11 is not bonded to the peripheral surfaces of the center holes 4. When the discs 1 and 5 are coated with the adhesive 11, the adhesive 11 neither passes through the center holes 4 nor moves around to the recording surfaces opposite to the bonding surfaces of the discs 1 and 5.

In such an optical information medium, the discs 1 and 5 are generally coated with the adhesive 11 and bonded thereby at the outer side thereof by a spin coating process. In this case, if the grooves 7 and 7 are defined in at least one of the bonding surfaces of the discs 1 and 5 at the area outside the non-bonding area m, when the discs 1 and 5 are coated with the adhesive 11, the adhesive 11 can stay in the grooves 7 and 7. As a result, it is possible to surely prevent the adhesive 11 from bonding to the non-bonding area m.

Meanwhile, if a center hole 4' of the disc 5 is greater than the diameter of the center hole 4 of the disc 1, and it is also greater than the diameter of the non-bonding area m, the adhesive 11 does not enter the non-bonding area m when the discs 1 and 5 are coated with the adhesive 11 at the bonding surfaces thereof and they are laid on top of the other. Accordingly, it is also surely possible to prevent the adhesive 11 from bonding to the non-bonding area m. In this case, if the part of the adhesive 11 moves around and bonds to the peripheral surface of the center hole 4' of the disc 5 having a large diameter, the resistivity of friction is reinforced at this portion.

The boundary of the non-bonding area m is not always circular and disposed at a fixed range from the centers of the discs 1 and 5 but may be indefinite. That is, the boundary of the non-bonding area m may be eccentric relative to the centers of the discs 1 and 5 or the boundary of the non-bonding area m may be of a different shape. In such a manner, the maximum amplitude Q of a mechanical resonance frequency $f_0$ may be reduced, so that the oscillation of the optical information medium can be reduced at the high speed revolution thereof.

PREFERRED EMBODIMENT OF THE INVENTION

Figure 1:
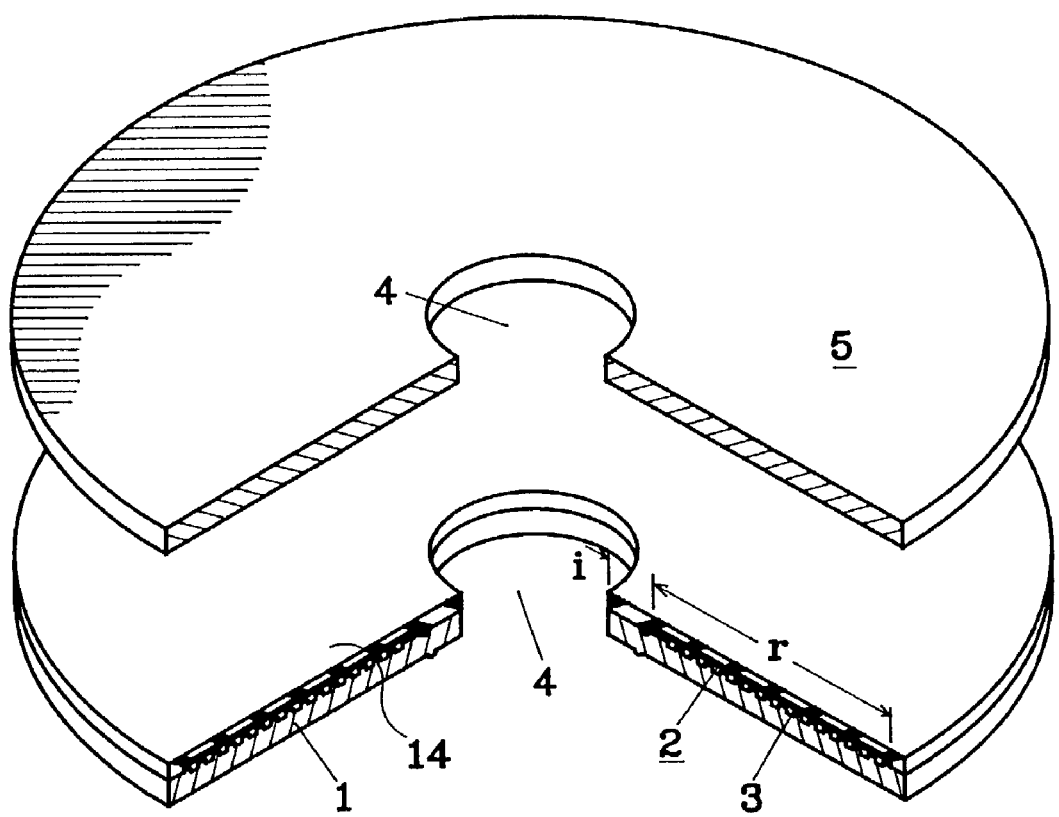
FIG. 1 is an exploded perspective cross-sectional view of an optical information medium which is cut substantially half in a state before two discs are bonded to each other according to a first embodiment of the invention.

The optical information medium according to various embodiments of the present invention will now be described in detail with reference to the attached drawings.

One example of the optical information medium of the invention is of a WORM type having one surface record/reproduction structure formed by bonding two surfaces of two discs.

A material for the disc 1 includes, for example, glass and plastics such as epoxy resins, methacrylate resins, polycarbonate resins, polyester resins, polyvinyl chloride resins and the like. As a material for the disc 5 to be laminated thereto in the case of one-side recording type, there may be used, other than the above mentioned material, thermoplastic resins such as polyolefins, polyamides, polyvinyl alcohols, polyacetals, fluoroplastics and the like, as well as phenol resins, polyurethane resins, epoxy resins, amino resins, unsaturated polyester resins, alkyd resins, silicone resins and the like.

An information recording area r is set or formed on one surface of the transparent disc 1 outside an inner peripheral side information non-recording area i. A tracking guide 3 comprising spiral grooves is formed on the information recording area r. The tracking guide 3 has a pitch which normally ranges from 0.74 to 0.8 μm.

Further, an information recording layer 2 is provided on the main surface of the disc 1 on which the information recording area r is formed. For example, the disc 1 is coated with an organic dye, etc. to provide an optical recording layer 12 by means of a spin coating process, etc., then a reflecting layer 13 made of a metal film is provided on the optical recording layer 12. The optical recording layer 12 and reflecting layer 13 form the information recording layer 2, and a portion where the optical recording layer 12 and reflecting layer 13 are provided is the information recording area r. A protecting layer 14 is provided on the entire surface of the main surface of the disc 1 so as to cover the reflecting layer 13. Further, an information non-recording area i is set or formed between the inner side of the information recording area r to a center hole of the disc 1.

The optical recording layer 12 may be formed, for example, by spin coating a solution of a cyanine dyestuff, azo dyestuff, and other organic dyestuffs followed by drying. The optical recording layer 12 may further contain another compound such as a single state oxygen quencher, and a photo-absorbing agent and the like.

As a solvent for dissolving the above mentioned dyestuff, there may be used chloroform, dichloroethane, fluorinated solvents including fluorinated alcohol, etc., methyl ethyl ketone, dimethylformamide, methanol, toluene, cyclohexanone, acetyl acetone, diacetone alcohol, cellosolves including methyl cellosolve, etc., dioxane and the like. In this case, an amount of cyanine dye to be mixed is preferably 1 to 10% by weight.

As the reflecting layer 13, is exemplified a metal film such as gold, aluminum, silver and copper formed by evaporation, sputtering, and an alloy metal film of the combination thereof. As the protecting layer 14, is exemplified a radiation curing resin solvent such as a UV curing resin which is coated by a spin coating method and the resin is cured with UV light.

The WORM optical information medium has the following specific dimensions. The diameter of the center hole 4 of the disc 1, namely, the inner diameter of the disc 1 is 15 mm, and the outer diameter and the thickness of the disc 1 are respectively 120 mm and 0.6 mm. The tracking guide 3 and information recording layer 2 are provided on the disc 1 at the area ranging from 48 mm to 116 mm in diameter thereof to form the information recording area r.

Further, another disc 5 is prepared in addition to the disc 1. Although disc 5 is made of the same material as the disc 1 and has the same size as the disc 1, the tracking guide 3 and information recording layer 2 are not provided on the disc 5 although they are provided on the disc 1. It is needless to say it is possible that the information recording area r having the tracking guide 3 and information recording layer 2 are formed on disc 5 like the disc 1.

Thereafter, the two discs 1 and 5 are bonded to each other. For example, one main surface of at least one of the discs 1 and 5 is entirely coated with a reactive curing resin as an adhesive 11 by a normally employed coating means such as a spin coating process or screen printing process, gravure printing process, dipping process, or a spray coating process, then, the discs 1 and 5 are laid on top of the other while they oppose each other, and thereafter the aforementioned reactive curing resin is cured. As a result, the main surfaces of the discs 1 and 5 are bonded to each other by the adhesive 11 which is formed when the reactive curing resin cures. In this case, the surface of the disc 1 on which the information recording layer 2 and the protecting layer 14 are provided is bonded to the main surface of another disc 5.

As the adhesive layer, there are exemplified an adhesive made of a curing resin or that made of a hot melt material. If the UV curing resin is used as the curing resin adhesive, the protecting layer 14 of the disc 1 is coated by a spin coating process, a screen printing, etc. then the disc 5 is laid on the disc 1, thereafter the UV curing resin is irradiated with the UV rays from the side of the disc 1 or disc 5. As a result, the adhesive is cured. It is also possible to use an electron curing resin or other radiation curing resin other than the UV curing resin. In case of the adhesive layer formed of a hot melt material, the protecting layer 14 of the disc 1 is coated with the melted adhesive by a roll coater, then the disc 5 is laid on the disc 1, and the adhesive layer is cooled to cure in this state.

The adhesive 11 is shrunk when it cures and the shrinkage rate is less than 15%. As the means for making the shrinkage rate less than 15% is the selection of a resin material.

For example, in the case of a radiation curing resin such as a UV curing resin, a reactive diluent, a photo-initiator and the like may be added to a resin component.

More precisely, a monomer and an oligomer of a polymerizable organic compound may be coated on the disc 1 followed by forming an adhesive layer through a crosslinking reaction. When the adhesive layer of an organic polymer is formed by the crosslinking reaction, it is convenient from a standpoint of workability to add a small amount of a reaction initiator and a reaction catalyst to a mixture of a monomer and an oligomer of an organic compound which has one or more than two reactive acrylonitrile radicals in a molecule, coat the liquid mixture on the disc and subject it to a crosslinking reaction by ultraviolet or electronic radiation. However, a crosslinking process is not restricted to the above-mentioned method and may include thermal crosslinking which is applied to an epoxy resin or a urethane resin.

In the case of a hot-melt material, it is preferable that the melting temperature is, for example, 130° C. and the melting viscosity is, for example, 170,000 centipoise at 160° C. from a standpoint of coating workability. A practical material includes MELTORON 3S49 available from DIAPOND INDUSTRY Co., Ltd. Such a hot-melt material is quite easily used by simply cooling the material without dipping a surface thereof to be coated in a solvent or applying light irradiation for curing.

It is necessary that the shrinkage rate of the adhesive is less than 15%. If the shrinkage rate exceeds 15%, the influence caused by the stress thereof affects the optical recording layer, thereby generating distortion whereby the reflectance of the laser beam deteriorates to deform the optical information medium.

The thickness of the adhesive 11 needs to range from 10 to 80 μm. If the adhesive 11 has such a thickness, the curing resin such as a UV curing resin shows a viscosity at the coating layer like the UV curing resin. Even if bubbles are generated in the main surface of the coating layer when the main surface of another disc contacts the coating layer, the viscous adhesive flows to fill up the holes of the bubbles and also reduces the stress generated based on the bubbles by the plasticity and elasticity of the resin even if the viscous adhesive is solidified by the irradiation of UV rays while the bubbles remain therein, thereby reducing the influence of the stress against the recording layer. If the thickness of the adhesive is less than 10 μm, such a reduction cannot be performed while if the thickness of the adhesive exceeds 80 μm, the curing speed of the adhesive layer decreases so that the adhesive is liable not to cure. The thickness of the adhesive 11 preferably ranges from 30 to 70 μm.

Since the discs 1 and 5 are bonded by the adhesive 11 at the main surfaces thereof including the inner side information non-recording area i extending from the peripheries of center holes 4 of the discs 1 and 5 to the outer peripheral surfaces thereof in the optical information medium which are formed by bonding the two discs 1 and 5, a high resistivity of friction is attained. Particularly, since the inner and outer peripheries of the discs 1 and 5 are completely closed by the adhesive 11, no air enters inside the discs 1 and 5, and hence the moisture resistance and weather resistance are respectively improved.

When the adhesive 11 spreads outward from the inner peripheral surfaces of the center holes 4, it moves around the inner peripheral surfaces of the discs 1 and 5 to be fixed thereto, thereby enhancing shock absorbance at the center holes 4.

For example, at least one surface of the discs 1 and 5 is turned upward, and UV curing resin which does not cure on the surface as the adhesive 11 drops on the surface so as to level the resin while the discs 1 and 5 rotate. The adhesive 11 drops at the portion adjacent to the center holes 4. Thereafter, the given surfaces of the discs 1 and 5 to be bonded to each other are laid on top of the other. As a result, the adhesive 11 spreads between the discs 1 and 5 from the pressure which the discs 1 and 5 receive or capillary phenomenon. At the time when the adhesive spreads between the discs 1 and 5 at the entire surface of the information non-recording area i, the discs 1 and 5 are rotated at high speed to wipe off surplus UV curing resin. Then, the UV curing resin is irradiated with UV rays from one surface side of the transparent discs 1 and 5, to cure the adhesive so as to form the adhesive layer, whereby the discs 1 and 5 are brought into contact with each other and fixed by the adhesive 11. Considering the shock absorbance of the optical information medium, the hardness of the adhesive after curing is preferably higher than that of the substrate.

The first embodiment relates to the case where the disc 1 having the tracking guide 3 and the information recording layer 2, which are respectively formed on the information recording area r on the transparent substrate, and the disc 5, having no information recording layer, are bonded to each other. In this case, the recording and reproduction can be made at one surface of the disc 1 or disc 5. The disc 5 may be formed to have no transparency or be colored for maintaining the light resistance or have an area in which characters and patterns can be written in the surface thereof.

Meanwhile, two pieces of discs 1, each having the tracking guide 3 and information recording layer 2 provided at the information recording area r on the transparent substrate, are prepared, and the information recording layers 2 oppose each other to form an optical information medium capable of recording and reproducing at both surfaces thereof. As the disc 5 to be used in this case, there is used a disc like the disc 1 of the discs 1 and 5 shown in FIG. 1 wherein the tracking guide 3 and the information recording layer 2 are provided on the information recording area r.

Figure 3:
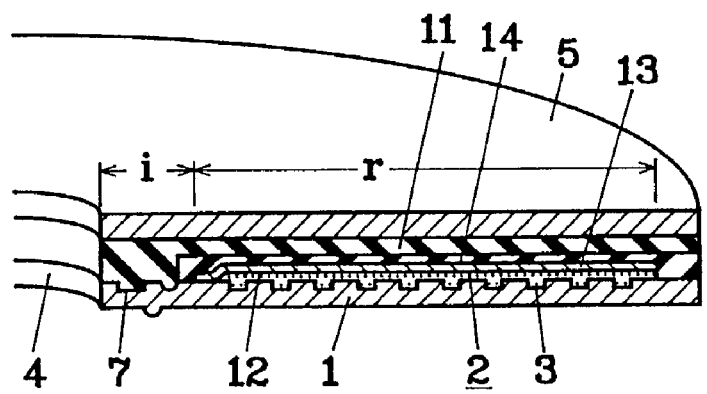
FIG. 3 is a longitudinal sectional view of the optical information medium of claim 1, which is cut partially according to a second embodiment of the invention.

FIG. 3 shows an optical information medium according to a second embodiment of the invention. In the second embodiment, the groove 7 is defined between the center hole 4 of the disc 1 at the bonding surface thereof and the information non-recording area i, and the adhesive 11 is filled in the groove 7. It is needless to say that the same groove 7 may be defined in the disc 5. When the bonding surfaces of the discs 1 and 5 are coated with the adhesive 11, the adhesive 11 flows and stays in the groove 7 so that the bonding surface area in the bonding surfaces of the discs 1 and 5, particularly in the inner periphery thereof increases, whereby the resistivity of friction is reinforced by the adhesive 11 filled in the groove 7, due to a so-called anchor effect.

The groove 7 may be formed in a plurality of different manners and the adhesive 11 may be reserved in the groove utilizing these differences, which makes it easy to form the information recording layer by a spin coating process.

Figure 4:
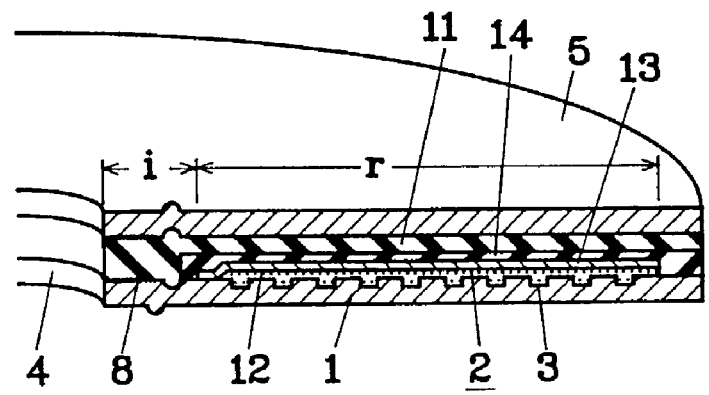
FIG. 4 is a longitudinal sectional view of the optical information medium, which is cut partially according to a third embodiment of the invention.

FIG. 4 is a longitudinal partial sectional view of the optical information medium according to a third embodiment of the invention. In this embodiment, a rough surface 8 having fine irregularities are formed between the center holes 4 of the discs 1 and 5 at the bonding surfaces thereof and information non-recording area i instead of the groove 7. The rough surface 8 is formed on both discs 1 and 5. The resistivity of friction is reinforced at the inner peripheral surfaces of discs 1 and 5 by the rough surface 8, like the groove 7 in the second embodiment set forth above. The rough surface 8 may be characteristic information engraved in the surfaces of the discs 1 and 5, e.g., a lot number or a product number.

Further, a protrusion 9 is formed on both surfaces of the discs 1 and 5 in this embodiment shown in FIG. 4. Since the protrusion 9 is formed on the surfaces of discs 1 and 5, it prevents the surfaces of the discs 1 and 5 from being injured when the optical information medium is laid on top of the other.

The outer and inner peripheral sides of the information recording area r, namely, the outside of the area from the record starting portion to the record ending portion are marginal portions, where the optical recording layer 12 and reflecting layer 13 are not formed. The marginal portions at the outer and inner peripheral sides of the information recording area r having no optical recording layer 12 or reflecting layer 13 of two discs 1 and 5 are also bonded by the adhesive 11.

If an area where the optical recording layer 12 and reflecting layer 13 having respectively a length of 0.1 mm or more are present at the marginal portion of the outer peripheral sides of the information recording area r of the discs 1 and 5, a non-continuous area is formed on the boundary surface between the reflecting layer 13 and optical recording layer 12 which is particularly weak in the shock absorbance of the disc edge portion, thereby reinforcing the resistivity of friction. As a result, the shock absorbance at the outer peripheral portions can be enhanced. Further, if an area where the optical recording layer 12 and reflecting layer 13 having respectively, a length of at least 0.1 mm or more are not present at the marginal portion of the inner peripheral sides of the information recording area r of the discs 1 and 5, the adhesion between the discs 1 and 5 and the hermeticity of the optical recording layer 12 can be improved. As a result, the reliability of the record is secured and the moisture resistance of the optical recording layer 12 is improved, thereby obtaining an optical information medium having a high strength and having no warp, even if the clamping areas are not bonded to each other.

If the width of the marginal portion is less than 0.1 mm, the effect for improving the adhesion between the discs 1 and 5 is poor, and hence it needs to be more than 0.1 mm. The width of the marginal portion preferably exceeds 1.5 mm.

Figure 2:
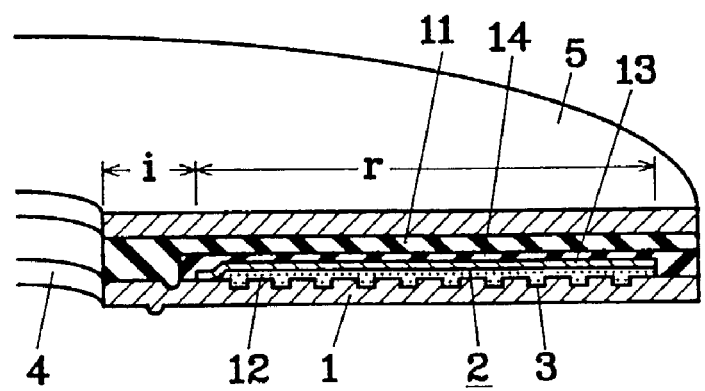
FIG. 2 is a longitudinal partial sectional view of the optical information medium of claim 1.
Figure 5:
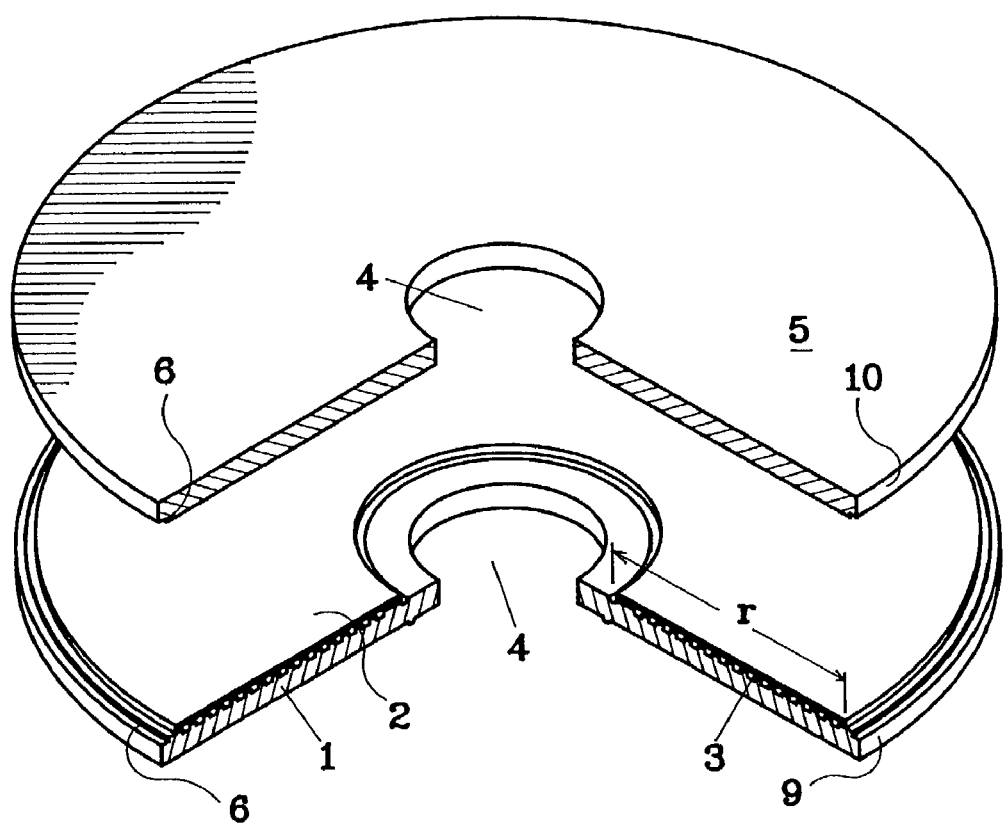
FIG. 5 is an exploded perspective cross-sectional view of an optical information medium which is cut substantially half in a state before two discs are bonded to each other according to a fourth embodiment of the invention.
Figure 6:
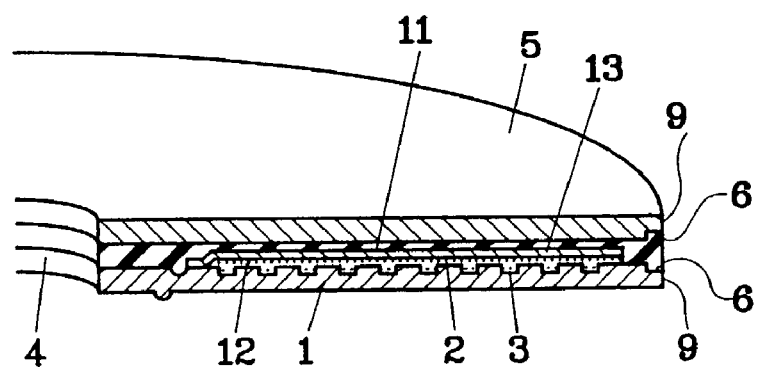
FIG. 6 is a longitudinal partial sectional view of the optical information medium of FIG. 5, which is cut partially.

As mentioned above, the resistivity of friction between the discs 1 and 5 is particularly weak between the dye film and metal film, and hence if the dye film remains on the edge of the disc 1, flake between the dye film and metal film is liable to occur at that portion. Compared with this, sufficient resistivity of friction can be obtained between the discs 1 and 5, between the metal films, and between the disc 1 and metal film. Accordingly, it is necessary not to form the dye film for forming the optical recording layer 12 at the aforementioned marginal portions. In other words, if the dye film is not present at the marginal portion, the adhesion and hermeticity can be secured even if there is a metal film for forming the reflecting layer 13. As an optical information medium according to a fourth embodiment, a WORM optical information medium having one surface record/reproduction structure formed by bonding two surfaces of discs will be now described with reference to FIGS. 6 and 5. The structure of this optical information medium is principally the same as that shown in FIGS. 1 and 2, and hence the components which are the same as those in FIGS. 1 and 2 are denoted by the same numerals.

In the optical information medium, the grooves 6 and 6 are defined in the outer peripheral edges of the discs 1 and 5 and have the difference in which the outer peripheral edge thereof is thinner than the inner periphery thereof. The grooves 6 and 6 appear on outer peripheral surfaces 9 and 9 of the discs 1 and 5. In the fourth embodiment in these figures, the grooves 6 and 6 are defined in the entire peripheries of the outer peripheral surfaces 9 and 9 of the discs 1 and 5, but they may be formed in a part of the outer peripheries of the discs 1 and 5.

Then, two pieces of the discs 1 and 5 are bonded to each other. At least one main surface of the discs 1 or 5 is coated with the reactive curing resin as the adhesive 11, for example, by a spin coating process or screen printing, then the discs 1 and 5 are laid on top of the other while opposing each other, thereafter the reactive curing resin is cured. As a result, the main surfaces of the discs 1 and 5 are bonded to each other by the layer of the adhesive 11 which is formed when the reactive curing resin is cured. In this case, the discs 1 and 5 are bonded to each other at the surfaces where the grooves 6 and 6 are defined.

It is desirable that the information recording layer 2 is not provided on the surfaces where the outer peripheral portions of the discs 1 and 5 are not bonded to each other, and it is preferable that the discs 1 and 5 are directly bonded to each other or the surface of the disc 1 or disc 5 and the protecting layer is bonded to each other.

Figure 7:
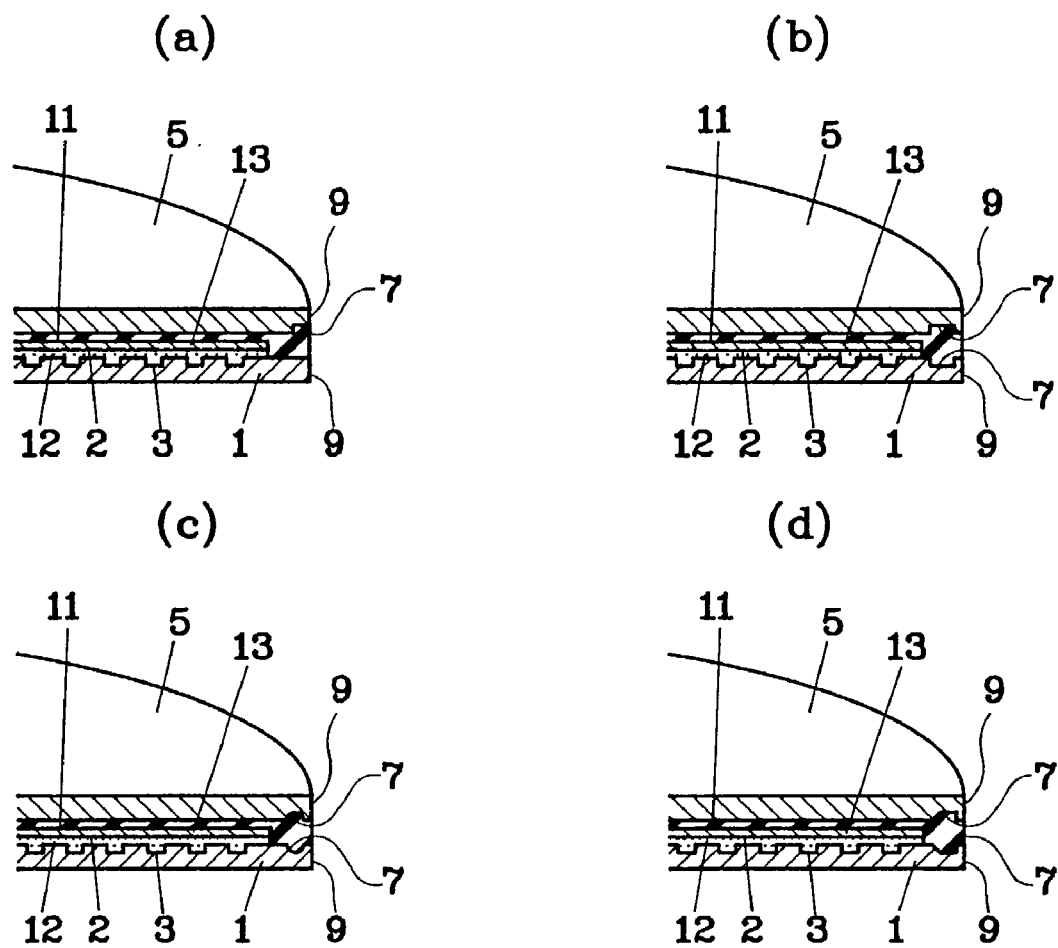
FIG. 7(a) to 7(d) are longitudinal sectional views of the optical information medium, which are cut partially according to a fifth embodiment of the invention.

FIG. 7 shows an optical information medium according to a fifth embodiment of the invention. In FIG. 7(a), the groove 7 is defined in only the outer peripheral edge of the information recording layer 2, and the groove 6 is not defined in the disc 1. In FIGS. 7(b) to (d), the grooves 6 and 6 are defined in the main surfaces of the discs 1 and 5 at the position close to the inner peripheral surface rather than the outer peripheral surface, and they do not appear on the outer peripheral surfaces of the discs 1 and S. Accordingly, in the optical information medium shown in FIGS. 7(b) to (d), it appears as if it had no outer peripheral surfaces like the optical information medium having no grooves 6 and 6 in external appearance. The grooves 6 and 6 of the discs 1 and 5 shown in FIG. 7(b) are rectangular. The grooves 6 and 6 of the discs 1 and 5 shown in FIG. 7(c) are semi-circular. The grooves 6 and 6 of the discs 1 and 5 shown in FIG. 7(d) have a trapezoidal shape, each having an inclination at one surface close to the centers of the discs 1 and 5. Particularly, in the optical information medium shown in FIGS. 7(c) and (d), the adhesive is liable to flow into the grooves 6 and 6, and hence it is adapted for introducing the adhesive having a high viscosity in the narrow grooves 6 and 6.

Figure 8:
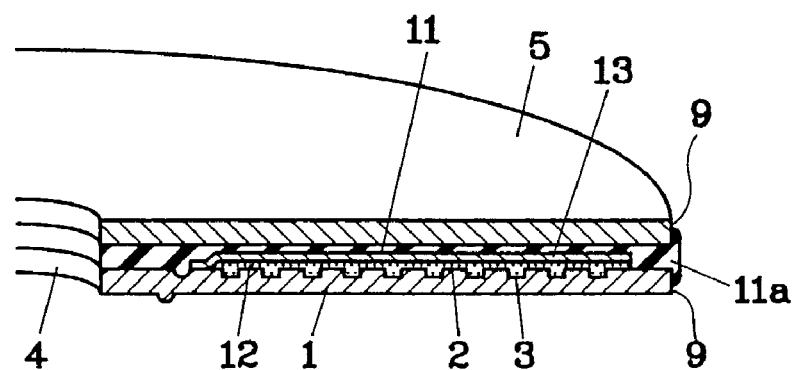
FIG. 8 is a longitudinal partial sectional view of the optical information medium, which is cut partially according to a sixth embodiment of the invention.

FIG. 8 shows an optical information medium according to a sixth embodiment of the invention, in which no groove is defined in the disc 5 as set forth above. However, a part 11a of the adhesive 11 moves around the outer peripheral surfaces 9 and 9 of the discs 1 and 5, and it is fixed to the outer peripheral surfaces 9 and 9. In this embodiment, even if the grooves 6 and 6 are not defined, the part 11a of the adhesive 11 which moved around the outer peripheral surfaces 9 and 9 of the discs 1 and 5 reinforces the resistivity of friction in the outer peripheral edges of the discs 1 and 5, thereby preventing the flaking and warpage at the outer peripheral sides of the discs 1 and 5. Also, in this embodiment, the grooves 6 and 6 shown in FIGS. 4 to 7 may be provided.

Figure 9:
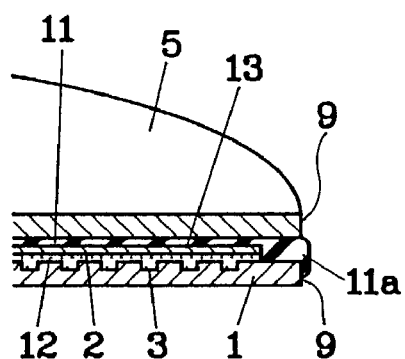
FIGS. 9(a) to 9(e) are longitudinal sectional views of the optical information medium, which are cut partially according to a seventh embodiment of the invention.
Figure 9:
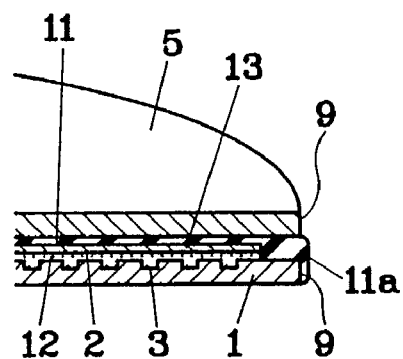
Figure 9:
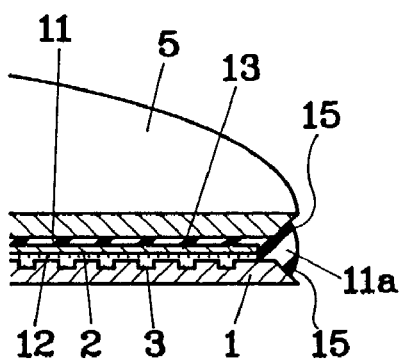
Figure 9:
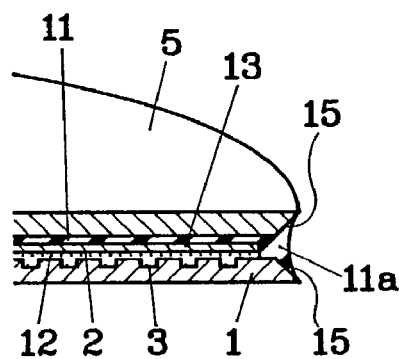
Figure 9:
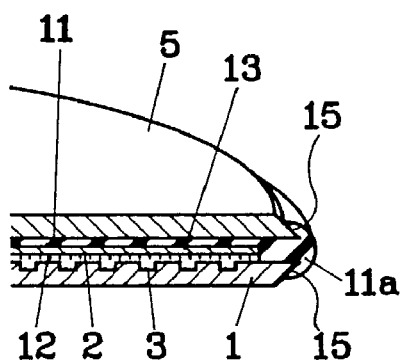

FIG. 9 shows an optical information medium according to a seventh embodiment of the invention. In FIGS. 9(a) and (b), the part 11a of the adhesive 11 moves around the outer peripheral surface 9 of the disc 1 and is fixed to the outer peripheral surface 9 but the adhesive 11 is bonded only to the outer peripheral surface 9 of the disc 1 where the information recording layer 2 is provided. Particularly, in FIG. 9(a), although the part 11a of the adhesive 11 is bonded to a part of the outer peripheral surface 9, in FIG. 9(b) a part 11a of the adhesive 11 is bonded to the entire surface of the outer peripheral surface 9 of the disc. In FIGS. (c) to (e), the inclination surfaces 15 and 15 are defined in the outer peripheral edges of the discs 1 and 5, and the part 11a of the adhesive 11 is bonded to the inclination surfaces 15 and 15. Particularly in FIGS. 9(c) and (d), the inclination surfaces 15 and 15 of the outer peripheries of the discs 1 and 5 are defined in the bonding surface sides. That is, the inclination surfaces 15 and 15 are obtuse relative to the bonding surfaces of the discs 1 and 5.

In FIG. 9(c), the part 11a of the adhesive 11 bonded to the edges of the inclination surfaces 15 and 15 protrude toward the outer peripheral sides while in FIG. 9(d), the part 11a of the adhesive 11 bonded to the edges of the inclination surfaces 15 and 15 form recesses at the outer peripheral sides. Meanwhile, in FIG. 9(e), the inclination surfaces 15 and 15 of the outer peripheries of the discs 1 and 5 are formed on the surfaces opposite to the bonding surfaces. That is, the inclination surfaces 15 and 15 have inclinations which are acute relative to the bonding surfaces of the discs 1 and 5. The part 11a of the adhesive 11 is bonded to both inclination surfaces 15 and 15.

Figure 10:
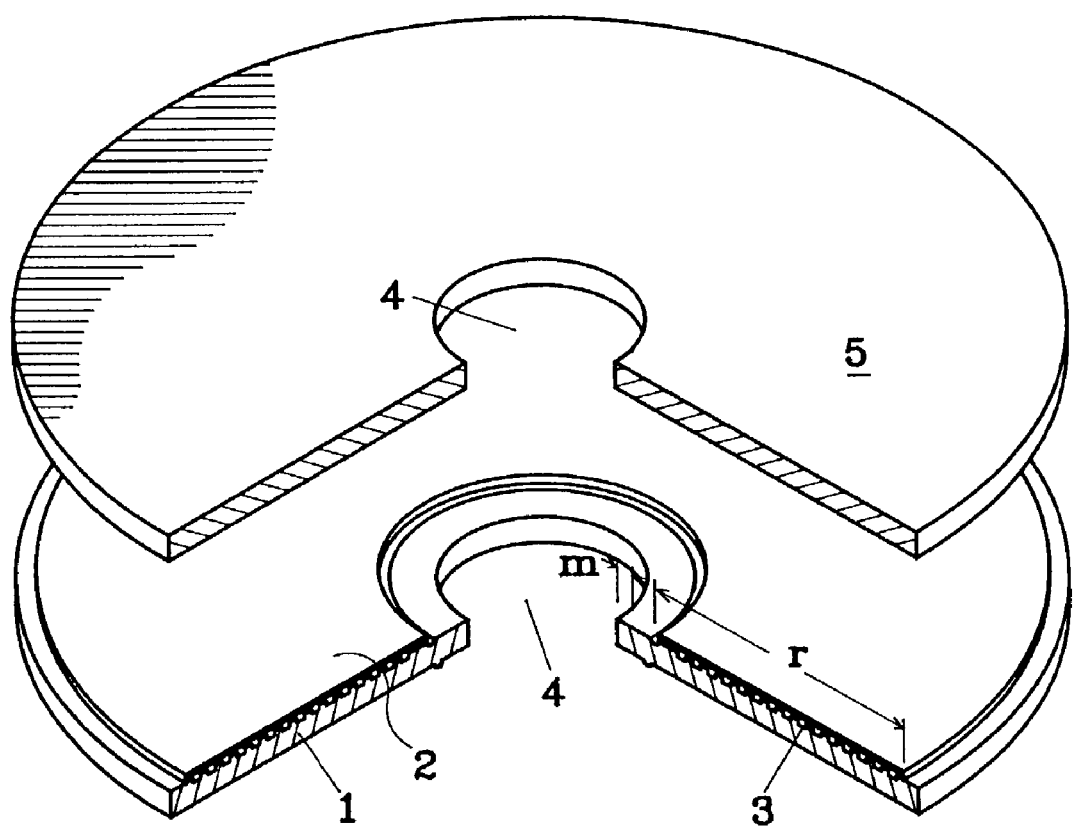
FIG. 10 is an exploded perspective cross-sectional view of an optical information medium which is cut substantially half in a state before two discs are bonded to each other according to an eighth embodiment of the invention.
Figure 11:
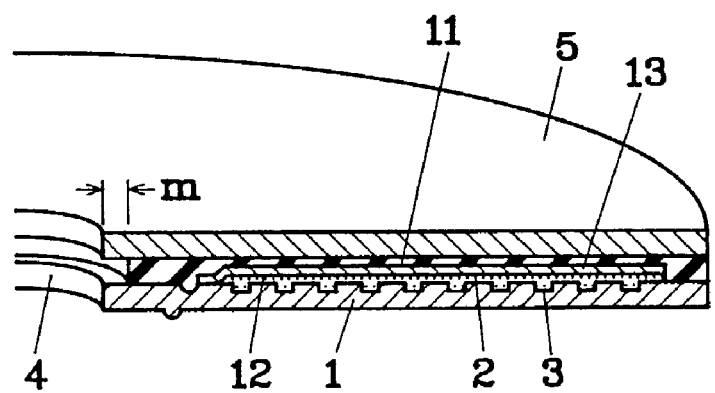
FIG. 11 is a longitudinal partial sectional view of the optical information medium of FIG. 10, which is cut partially.

As an optical information medium according to an eighth embodiment of the invention, the WORM optical information medium having one surface record/reproduction structure formed by bonding two surfaces of discs will be now described with reference to FIGS. 10 and 11. The structure of the optical information medium is principally the same as that shown in FIGS. 1 and 2, and hence the components which are the same as those in FIGS. 1 and 2 are denoted by the same numerals.

The non-bonding area m is set or formed between the center hole 4 and the inner information non-recording area at the surface where the information recording layer 2 of the disc 1 is provided. As described before, in the WORM optical information medium, the diameter of the center hole 4 of the disc 1, i.e. the inner diameter of the disc 1 is 15 mm, and the outer diameter of the disc 1 is 120 mm, and the thickness thereof is 0.6 mm. The non-bonding area m is formed at an area having a diameter ranging from a diameter of 15 mm to 26 mm. Further, the tracking guide 3 and information recording layer 2 are provided at the area of the disc 1 having a diameter ranging from 48 mm to 116 mm and this area is defined as the information recording area r. The information recording area r forms pits by the irradiation of the recording laser beam for bringing about an optical interference which light length is partially differentiated from other portions, to form the area for recording signals therein.

Another disc 5 is prepared in addition to the disc 1, and these discs 1 and 5 are bonded to each other. In this case, the surface where the information recording layer 2 is provided on the disc 1 is bonded. The non-bonding area m formed at the peripheries of the center holes 4 of the discs 1 and 5 are not coated with the adhesive 11, but the outside portions of the non-bonding area m are coated with the adhesive 11. Accordingly, the adhesive 11 is neither bonded to the non-bonding area m nor the peripheral surfaces of the center holes 4 of the discs 1 and 5 of the bonding surfaces of the discs 1 and 5.

Figure 12:
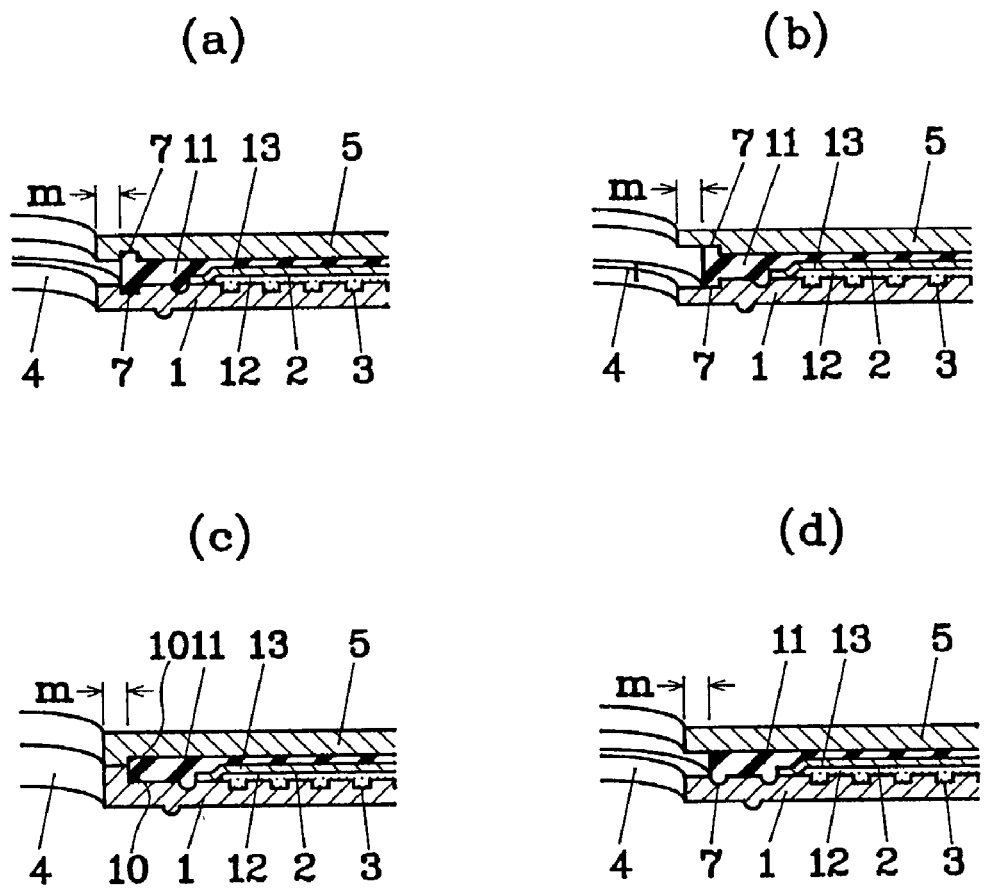
FIGS. 12(a) to 12(d) are longitudinal sectional view of the optical information medium, which are cut partially according to a ninth embodiment of the invention.

FIG. 12 is an optical information medium according to the ninth embodiment of the invention. In FIG. 12(*a*), rectangular grooves 7 and 7 are defined in the outside of the non-bonding area m of the bonding surfaces of the discs 1 and 5. When the bonding surfaces of the discs 1 and 5 are coated with the adhesive 11, the adhesive 11 flows into and stays in the grooves 7 and 7, thereby preventing the adhesive 11 from bonding to the non-bonding area m. Further, the bonding area outside the non-bonding area m of the bonding surfaces of the discs 1 and 5 increases by the provisions of the grooves 7 and 7, and the resistivity of friction is reinforced by the adhesive 11 entering the grooves 7 and 7, i.e. by a so-called anchor effect. In FIG. 12(*b*), the grooves 7 and 7 are defined from the outside of the non-bonding area m to the non-bonding area m and reach the center holes 4. Whereupon in FIG. 12(*c*), differences 10 and 10 are formed outside the non-bonding area m of the bonding surfaces of the discs 1 and 5, and hence the non-bonding area m alone is thicker than other bonding surfaces. As a result, the adhesive 11 bonds only to the portion outside the differences 10 and 10, and it is obstructed by the differences 10 and 10 and hence it does not bond to the non-bonding area m. The bonding surfaces of the non-bonding area m of the discs 1 and 5 are brought into contact with each other owing to the difference of the thicknesses. In FIG. 12(*d*), the groove 7 is defined in only the outside of the non-bonding area m of the bonding surface of the disc 1. The groove 7 is semi-cylindrical.

Figure 13:
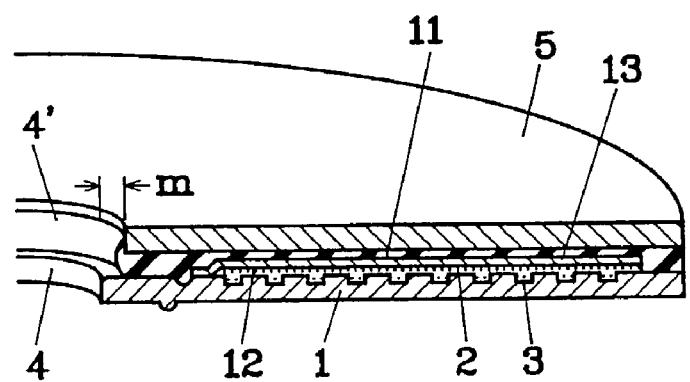
FIG. 13 is a longitudinal partial sectional view of the optical information medium, which is cut partially according to a tenth embodiment of the invention.

In an optical information medium shown in FIG. 13 according to a tenth embodiment of the invention, no groove is defined in the discs 1 and 5 but the center hole 4' of another disc 5 is larger than the center hole 4 of the disc 1. The diameter of the center hole 4' is substantially the same or greater than the outer diameter of the non-bonding area m. The portion corresponding to the outside portion of the center hole 4' alone of the bonding surfaces of the discs 1 and 5 is coated with the adhesive 11. The part of the adhesive 11 moves around the inner peripheral surface of the center hole 4' of the disc 5 and is fixed thereto, thereby reinforcing the resistivity of friction at the inner peripheral sides of the discs 1 and 5.

Figure 14:
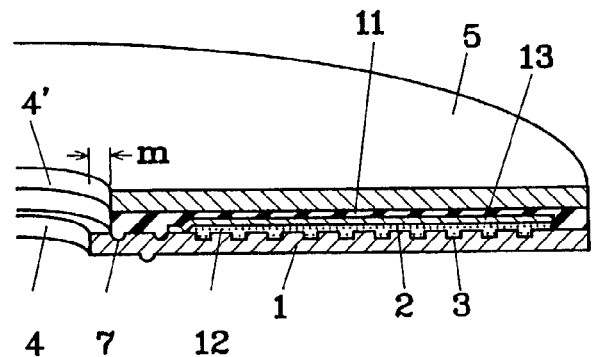
FIG. 14 is a longitudinal partial sectional view of the optical information medium, which is cut partially according to an eleventh embodiment of the invention.

In an optical information medium shown in FIG. 14 according to an eleventh embodiment of the invention, the center hole 4' of another disc 5 is greater in diameter than the center hole 4 of the disc 1 like the embodiment of FIG. 13. The diameter of the center hole 4' of the large diameter of the disc 5 is substantially the same or greater than the outer diameter of the non-bonding area m. The groove 7 is defined in the outside of the non-bonding area m of the disc 1 having the center hole 4 of the small diameter. Only the portion corresponding to the outside of the groove 7 of the bonding surfaces of the discs 1 and 5 is coated with the adhesive 11. Since the adhesive 11 enters the groove 7 and stays therein, it hardly moves around the peripheral surface of the center hole 4' but the resistivity of friction is reinforced at the inner peripheral sides of the discs 1 and 5 from the adhesive 11 which entered the groove 7.

Figure 15:
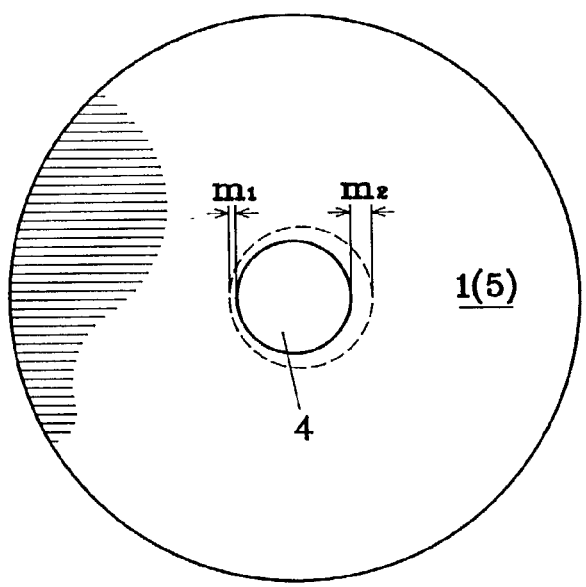
FIGS. 15(a) and 15(b) are plan views showing an example of the non-bonding area of the optical information medium of the present invention.
Figure 15:
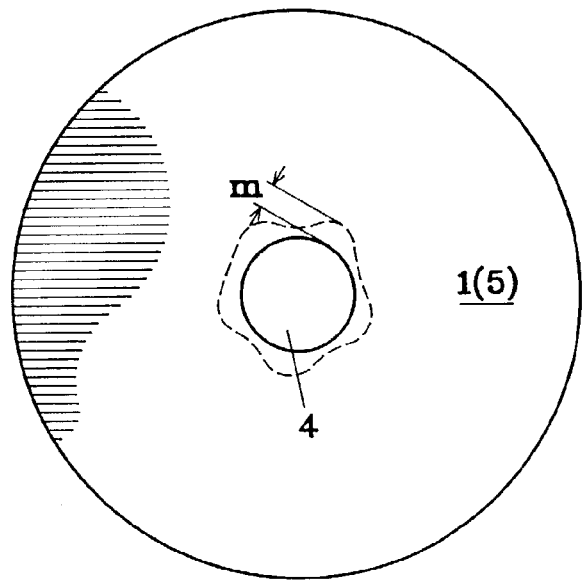
Figure 16:
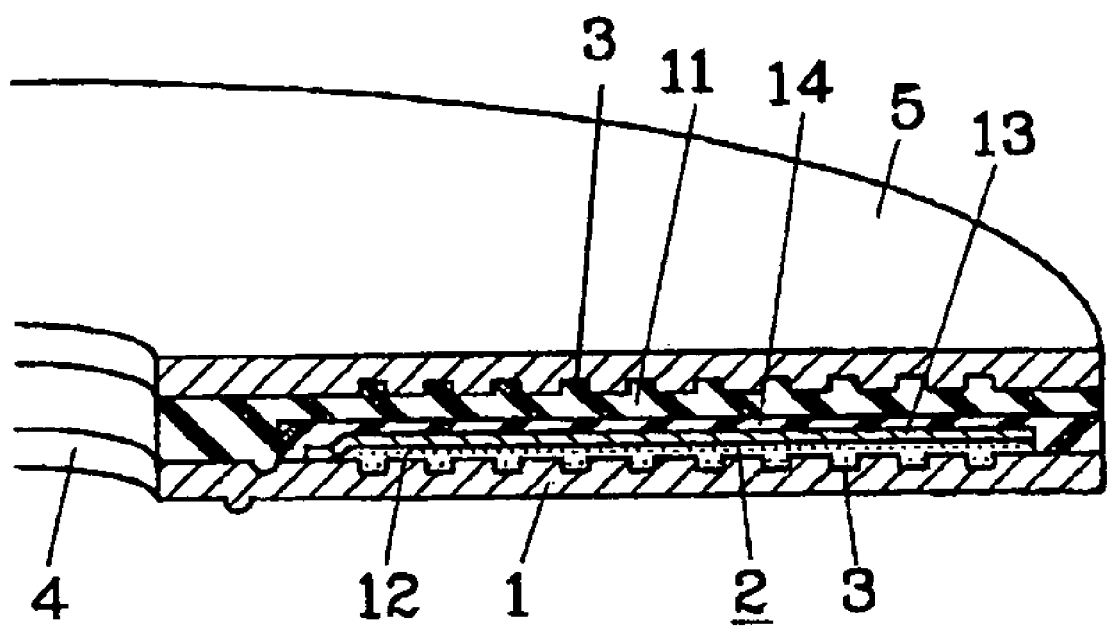
FIG. 16 is a longitudinal partial sectional view of an optical information medium having a tracking guide provided in both discs.

FIG. 15 shows the shape of the non-bonding area m set forth above, wherein denoted by dotted lines are a boundary of the non-bonding area m which is hidden behind the disc 1 or disc 5.

In the example of FIG. 15(*a*), the boundary of the non-bonding area m is eccentric relative to the centers of the discs 1 and 5. In FIG. 15(*b*), the boundary of the non-bonding area m is not circular, elliptical and polygonal, but an ungeometrical irregular shape. In any case of FIGS. 15(*a*) and (*b*), the boundary of the non-bonding area m is not constant or fixed in distance from the centers of the discs 1 and 5. Accordingly, the maximum amplitude Q of the mechanical resonance frequency $F_0$ becomes small, thereby decreasing the oscillation of the discs at the time of the high revolution of the optical information medium.

Specific examples of the invention will be now described with reference to specific numeric values.

1st EXAMPLE

A carbocyanine dye having a trimethylene chain (NK 4321; available from Nippon Kanko-shikiso Kenkyusho Co., Ltd.), represented by the following formula, was dissolved in 3 ml of diacetone alcohol to form a solution of 40 mg/ml concentration, and a solution of the cyanine dye thus prepared was coated on a polycarbonate substrate of 0.6 mm in thickness by a spin coating process to form an optical recording layer comprising a layer 100 mm thick of the optical absorption dye.

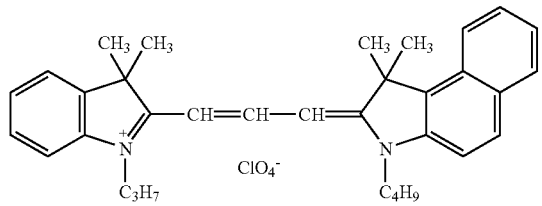

A reflecting layer formed of gold is provided on the optical recording layer by a sputtering process, then the reflecting layer is coated with the UV curing resin (made of Dainippon Ink & Chemicals under the product name of SD211) by a spin coating process, and the UV curing resin is cured to form a protecting layer (5 μm) formed of the UV curing film, whereby a pair of discs are fabricated. The protecting layer of one disc is coated with an adhesive made of the UV curing resin (made of Dainippon Ink & Chemicals under the product name of SD318) by a spin coating process, and the protecting layer of another disc is permitted to contact this adhesive, then the adhesive is irradiated with UV rays through the contacted another disc, thereby curing the adhesive.

The curing coating film of the UV curing resin employed by the adhesive layer has a pencil hardness (hand writing process of JISK5400 is used) of 2H at the temperature of 25° C., and the curing shrinkage rate is 8.5%, and the curing film of the adhesive layer has substantially the same hardness and shrinkage. In such a manner, a both surface recording type optical disc is obtained by bonding a pair of opposing substrates, each having a main surface on which the optical absorbing layer, reflecting layer and protecting layer are provided, and the protecting layers of both substrates are bonded to each other by the adhesive layer. Upon visual inspection of the external appearance of the cured adhesive layer, bubbles are not mingled in the adhesive layer and no deformation of the optical disc is recognized. The variation rate of reflectance and the variation of push-pull signals (tracking error signal variation, hereinafter referred to as PP) of the optical disc are checked with an optical pick up (NA: 0.6, λ: 638 nm). As a result, the variation rate is less than 5% and the PP is less than 15%. The structure of the optical disc is shown in Table 1 and the result of the test is shown in Table 3. The indication of "None" of "Mixing of Bubbles" in Table 3 shows that visible bubbles are not recognized. This is applied to the following examples.

2nd EXAMPLE

The optical disc is fabricated in the same manner as the 1st Example except the thickness of the adhesive layer is 37 μm, and the test is carried out like the 1st Example. The result of the test is shown in Table 3 and the structure of the 2nd Example is shown in Table 1. It is possible to make the adhesive layer thick by any of a method of coating resin fluid in concentrated form, a method of decreasing the speed of rotation of a spin coating apparatus, or a method of increasing the number of times of coating.

3rd AND 4th EXAMPLES

The optical disc of the 3rd and 4th Examples is fabricated in the same manner as the 1st Example except bubbles are mixed in the adhesive layer and the thicknesses of the adhesive layers are 37 μm and 35 μm, and the test is carried out like the 1st Example. The result of the test is shown in Table 3 and the structures of the 3rd and 4th Examples are shown in Table 1. The indication of "Bubbles Each Having Diameter of Exceeding Several 100 μm Are Not Mingled" means that bubbles having a diameter of less than several 100 μm may be mixed in the adhesive layer. This is applied to the following examples. Either the bubbles are mingled in the adhesive layer or not may be carried out by subjecting the coating layer to degassing or not under a vacuum when coating.

5th AND 6th EXAMPLES

The optical disc of the 5th and 6th Examples is fabricated in the same manner as the 1st and 4th Examples except the protecting layer is not provided and the thicknesses of the adhesive layers are 65 μm and 67 μm, and the test is carried out like the 1st Example. The result of the test is shown in Table 3 and the structures of the 5th and 6th Examples are shown in Table 1.

7th AND 8th EXAMPLES

The optical disc of the 7th and 8th Examples is fabricated in the same manner as the 5th and 6th Examples except the thicknesses of the adhesive layers are 68 μm and 69 μm and the reflecting layer is provided by sputtering aluminum (Al) instead of that of Au, and the test is carried out like the 1st Example. The result of the test is shown in Table 3 and the structures of the 7th and 8th Examples are shown in Table 1.

9th EXAMPLE

The optical disc of the 9th Example is fabricated in the same manner as the 1st Example except the thickness of the adhesive layer is 35 μm and the reflecting layer is provided by sputtering aluminum (Al) instead of that of Au, and the test is carried out like the 1st Example. The result of the test is shown in Table 3 and the structure of the 9th Example is shown in Table 1.

10th EXAMPLE

The optical disc of the 10th Example is fabricated in the same manner as the 9th Example except the optical recording layer is coated with a silane solution (made of The Shin-Etsu Chemical Co., Ltd. under the product name of KR220) by a spin coating process to form a film, then an optical enhancement layer having a thickness of 80 nm is formed with the thickness of the adhesive layer being 36 μm, and the test is carried out like the 1st Example. The result of the test is shown in Table 3 and the structure of the 10th Example is shown in Table 1.

11th EXAMPLE

The optical disc of the 11th Example is fabricated in the same manner as the 1st Example except a solution of 20% of azo dyestuff is employed instead of cyanine dyestuff, and the thickness of the adhesive layer is 25 μm, and the test is carried out like the 1st Example. The result of the test is shown in Table 3 and the structure of the 11th Example is shown in Table 1.

12th EXAMPLE

The optical disc of the 12th Example is fabricated in the same manner as the 1st Example except the resin of the adhesive layer is changed from the UV curing resin (made of Dainippon Ink & Chemicals under the product name of SD318) to the UV curing resin (made of Dainippon Ink & Chemicals under the product name of SD211), and the thickness of the adhesive layer is 25 μm, and the test is carried out like the 1st Example. The result of the test is shown in Table 3 and the structure of the 12th Example is shown in Table 1. The UV curing resin (made of Dainippon Ink & Chemicals under the product name of SD211) employed by the adhesive layer has a pencil hardness of 2H and the curing shrinkage rate is 10.3% which are respectively measured in the same manner as the curing coating film set forth above, and the curing film of the adhesive layer has substantially the same hardness and shrinkage rate.

13th EXAMPLE

The optical disc of the 13th Example is fabricated in the same manner as the 1st Example except the kind of resin of the adhesive layer is changed from the UV curing resin to a hot melt material, and the hot melt material is coated by a roll coating method, and the protecting layer of another disc is brought into contact with the coating layer of molten viscous hot melt material to cool the protecting layer, then both discs are bonded to each other with the thickness of the adhesive layer being 75 μm, and the test is carried out like the 1st Example. The result of the test is shown in Table 3 and the structure of the 13th Example is shown in Table 1. The hot melt material employed by the adhesive layer is that made of Daiya Bond Industry Co. and has a melting temperature of 125° C., and the curing shrinkage rate at the normal temperature is measured from the molten state thereof using Archimedes' process (Archimedes' principle), which reveals that the shrinkage rate is 6%, and the curing film of the adhesive layer has substantially the same shrinkage rate.

14th EXAMPLE

The optical disc of the 14th Example is fabricated in the same manner as the 1st Example except the resin of the adhesive layer is changed from the UV curing resin (made of Dainippon Ink & Chemicals under the product name of SD318) to the UV curing resin (made of Nippon Steel Corporation under the product name of V-2152), and the thickness of the adhesive layer is 72 μm, and the resin of the protecting layer is changed from the UV curing resin (made of Dainippon Ink & Chemicals under the product name of SD211) to the UV curing resin (made of Dainippon Ink & Chemicals under the product name of SD17) and the thickness of the protecting layer is 4 μm, and the test is carried out like the 1st Example. The result of the test is shown in Table 3 and the structure of the 14th Example is shown in Table 1. The UV curing resin (made of Nippon Steel Corporation under the product name of V-2152) employed by the adhesive layer has a pencil hardness of 2H and the curing shrinkage rate is 8.8% which are respectively measured in the same manner as the curing coating film set forth above, and the curing film of the adhesive layer has substantially the same hardness and shrinkage rate.

15th EXAMPLE

The optical disc of the 15th Example is fabricated in the same manner as the 14th Example except the thickness of the adhesive layer is 41 μm, and the thickness of the protecting layer is 6 μm, and the test is carried out like the 1st Example. The result of the test is shown in Table 3 and the structure of the 15th Example is shown in Table 1.

1st COMPARATIVE EXAMPLE

The optical disc is fabricated in the same manner as the 5th Example except the thickness of the adhesive layer is 6 μm, and the test is carried out like the 1st Example. The result of the test is shown in Table 3 and the structure of the 1st Comparative Example is shown in Table 2.

2nd COMPARATIVE EXAMPLE)

The optical disc is fabricated in the same manner as the 1st Example except the thickness of the adhesive layer is 5 μm, and the test is carried out like the 1st Example. The result of the test is shown in Table 3 and the structure of the 2nd Comparative Example is shown in Table 2.

3rd COMPARATIVE EXAMPLE

The optical disc is fabricated in the same manner as the 1st Example except the thickness of the adhesive layer is 85 μm, and the test is carried out like the 1st Example. The result of the test is shown in Table 3 and the structure of the 2nd Comparative Example is shown in Table 2.

4th COMPARATIVE EXAMPLE

The optical disc is fabricated in the same manner as the 1st Example except the kind of resin of the adhesive layer is changed to the UV curing acrylic resin having the pencil hardness of H and the curing shrinkage rate of 18%, which are respectively measured in the manner set forth above, and the thickness of the adhesive layer is 10 μm, and the test is carried out like the 1st Example. The result of the test is shown in Table 3 and the structure of the 4th Comparative Example is shown in Table 2.

From the results shown in the Tables, it is understood that the variation rate of the reflectance is less than 5%, which is not a critical level in each of the Examples 1 to 15, and there is not recognized the deformation of the optical disc caused by the stress in each of the Examples 1 to 15, and hence the stress actually influencing the adhesive layer is not generated. Whereupon, it is understood that there is recognized the deformation of the optical disc in the Comparative Examples 1 to 4, and the warpage occurs from the deformation of the optical disc in the Comparative Examples 3 and 4, which disables the recording of information. The results in the Comparative Examples are caused by the thickness of the adhesive layer, namely, they depend on too thin or too thick thicknesses and the curing shrinkage rate of the adhesive layer is too large.

Further, it is understood that since there is no distortion of the optical disc, even if it is recognized that bubbles having a diameter of exceeding several 100 μm are not mixed in the adhesive layer in the Examples, the influence of the stress, even if it is generated in the adhesive layer, is reduced by the thickness of the adhesive layer, thereby reducing the influence thereof.

It is preferable that the pencil hardness be more than 2H (at least 2H) in the Examples. Since there is no deformation of the optical disc and the variation of the reflectance can be restrained to less than 5% in the Examples, it may be limited to "the optical recording medium which is not deformed by controlling the shrinkage rate of the adhesive when the adhesive layer is cured and the variation of the Push-Pull signal (PP signal (Push-Pull signal) tracking signal)) is less than +15% (not exceeding ±15%) and the variation rate of the reflectance is less than 5% (not exceeding 5%)". The limiting conditions may be one of them. Meanwhile, 5% of the variation rate of the reflectance of the reflecting layer 13 is extended to a level which is not critical in the actual case in each level of the Examples, and this can be controlled by the shrinkage rate, etc. when the adhesive layer is cured. Still further, the aforementioned limitation of the conditions may be added.

TABLE 1

| Example | Adhesive layer | | | Recording Layer | Enhance Layer | | Protecting Layer | | Reflecting Layer |
| | Material | Pencil Hardness | Shrinkage Rate | Thickness | Material | Material | Thickness | Material | Thickness | Material |
| --- | --- | --- | --- | --- | --- | --- | --- | --- | --- | --- |
| 1 | SD318 | 2H | 8.5% | 17 μm | carbocyanine | — | — | SD211 | 5 μm | Au |
| 2 | SD318 | 2H | 8.5% | 37 μm | carbocyanine | — | — | SD211 | 5 μm | Au |

TABLE 1-continued

| Example | Adhesive layer | | | | Recording Layer | Enhance Layer | | Protecting Layer | | Reflecting Layer |
|---|---|---|---|---|---|---|---|---|---|---|
| | Material | Pencil Hardness | Shrinkage Rate | Thickness | Material | Material | Thickness | Material | Thickness | Material |
| 3 | SD318 | 2H | 8.5% | 37 μm | carbocyanine | — | — | SD211 | 5 μm | Au |
| 4 | SD318 | 2H | 8.5% | 35 μm | carbocyanine | — | — | SD211 | 5 μm | Au |
| 5 | SD318 | 2H | 8.5% | 65 μm | carbocyanine | — | — | — | — | Au |
| 6 | SD318 | 2H | 8.5% | 67 μm | carbocyanine | — | — | — | — | Au |
| 7 | SD318 | 2H | 8.5% | 68 μm | carbocyanine | — | — | — | — | Al |
| 8 | SD318 | 2H | 8.5% | 69 μm | carbocyanine | — | — | — | — | Al |
| 9 | SD318 | 2H | 8.5% | 35 μm | carbocyanine | — | — | SD211 | 5 μm | Al |
| 10 | SD318 | 2H | 8.5% | 36 μm | carbocyanine | KR-220 | 80 nm | SD211 | 5 μm | Al |
| 11 | SD318 | 2H | 8.5% | 25 μm | azo dye | — | — | SD211 | 5 μm | Au |
| 12 | SD211 | 2H | 10.3% | 25 μm | carbocyanine | — | — | SD211 | 5 μm | Au |
| 13 | Hot Melt Material | | | 75 μm | carbocyanine | — | — | SD211 | 5 μm | Au |
| 14 | V-2152 | 2H | 8.8% | 72 μm | carbocyanine | — | — | SD17 | 4 μm | Au |
| 15 | V-2152 | 2H | 8.8% | 41 μm | carbocyanine | — | — | SD17 | 6 μm | Au |

TABLE 2

| Comparative Example | Adhesive layer | | | | Recording Layer | Enhance Layer | | Protecting Layer | | Reflecting Layer |
|---|---|---|---|---|---|---|---|---|---|---|
| | Material | Pencil Hardness | Shrinkage Rate | Thickness | Material | Material | Thickness | Material | Thickness | Material |
| 1 | SD318 | 2H | 8.5% | 6 μm | carbocyanine | — | — | — | — | Au |
| 2 | SD318 | 2H | 8.5% | 5 μm | carbocyanine | — | — | SD211 | 5 μm | Au |
| 3 | SD318 | 2H | 8.5% | 85 μm | carbocyanine | — | — | SD211 | 5 μm | Au |
| 4 | UV Curing Acrylic Resin | 2H | 18% | 10 μm | carbocyanine | — | — | SD211 | 5 μm | Au |

TABLE 3

| | Visual Inspection of External Appearance | | | |
|---|---|---|---|---|
| | Mixing of Bubble | Deformation of Disc | Variation Rate of Reflectance | Variation of a Push-Pull Signal |
| Example | | | | |
| 1 | None | None | 3.8% | 7.8% |
| 2 | None | None | 3.0% | 6.2% |
| 3 | Bubble Each Having Diameter of Exceeding Several 100 μm Are Not Mingled | None | 4.7% | 8.1% |
| 4 | Bubble Each Having Diameter of Exceeding Several 100 μm Are Not Mingled | None | 4.5% | 10.1% |
| 5 | Bubble Each Having Diameter of Exceeding Several 100 μm Are Not Mingled | None | 4.0% | 9.8% |
| 6 | None | None | 3.1% | 9.0% |
| 7 | Bubble Each Having Diameter of Exceeding Several 100 μm Are Not Mingled | None | 4.9% | 8.8% |
| 8 | None | None | 4.3% | 6.2% |
| 9 | None | None | 4.8% | 9.1% |
| 10 | None | None | 4.0% | 14.8% |
| 11 | None | None | 3.8% | 12.0% |
| 12 | None | None | 4.5% | 11.3% |
| 13 | None | None | 3.0% | 9.0% |
| 14 | None | None | 3.3% | 10.2% |
| 15 | None | None | 3.0% | 6.3% |
| Comparative Example | | | | |
| 1 | Yes | Yes | 11.8% | 18.7% |
| 2 | Yes | Yes | 14.6% | 19.6% |
| 3 | Recording is Impossible Owing to Warpage Occurred Curing Shrinkage | | 14.2% | 18.1% |
| 3 | Recording is Impossible Owing to Warpage Occurred Curing Shrinkage | | 14.1% | 22.3% |

What is claimed is:

1. An optical information medium comprising a pair of discs which have center holes, an optical recording layer provided on at least one of the discs, a reflecting layer formed on an upper side of the optical recording layer and an adhesive layer provided on the reflecting layer for bonding the pair of discs, wherein each of the discs has a tracking guide provided therein, is made of a polycarbonate resin and has an outer diameter of 120 mm and a thickness of 0.6 mm, the discs are bonded to each other at surfaces extending from the center holes to the outermost peripheries of the discs, a non-bonding area is provided at peripheries of the center holes where no adhesive is provided and the diameter of the center hole of one disc is larger than the diameter of the center hole of the other disc and is also larger than the diameter of the non-bonding area.

* * * * *